United States Patent [19]

Ijiri et al.

[11] Patent Number: 4,703,997
[45] Date of Patent: Nov. 3, 1987

[54] WATERPROOF OPTICAL FIBER CABLE

[75] Inventors: Yasuo Ijiri, Amagasaki; Eiji Iri, Itami; Toshitaro Oguchi; Koichiro Aritomi, both of Osaka, all of Japan

[73] Assignee: Dainichi-Nippon Cables, Ltd., Hyogo, Japan

[21] Appl. No.: 698,461

[22] Filed: Feb. 5, 1985

[30] Foreign Application Priority Data

| Mar. 3, 1984 | [JP] | Japan | 59-40992 |
| Mar. 3, 1984 | [JP] | Japan | 59-40993 |
| Mar. 3, 1984 | [JP] | Japan | 59-40994 |
| Mar. 3, 1984 | [JP] | Japan | 59-40995 |
| Mar. 3, 1984 | [JP] | Japan | 59-40996 |
| Mar. 3, 1984 | [JP] | Japan | 59-40997 |

[51] Int. Cl.⁴ ................................. G02B 6/44
[52] U.S. Cl. ................................. 350/96.23
[58] Field of Search ...................... 350/96.23

[56] References Cited

U.S. PATENT DOCUMENTS

| 4,072,398 | 2/1978 | Larsen et al. | 350/96.23 |
| 4,113,349 | 9/1978 | Stiles | 350/96.23 |
| 4,158,478 | 6/1979 | D'Auria et al. | 350/96.23 |
| 4,278,835 | 7/1981 | Jackson | 350/96.23 |
| 4,324,453 | 4/1982 | Patel | 350/96.23 |
| 4,333,706 | 6/1982 | Davis et al. | 350/96.23 |
| 4,387,958 | 6/1983 | Zeidler et al. | 350/96.23 |
| 4,388,485 | 6/1983 | Zeidler et al. | 350/96.23 |
| 4,491,386 | 1/1985 | Negishi et al. | 350/96.23 |

FOREIGN PATENT DOCUMENTS

| 0032268 | 7/1981 | European Pat. Off. | |
| 160778 | 11/1985 | European Pat. Off. | 350/96.23 |
| 2728642 | 1/1979 | Fed. Rep. of Germany | |
| 2847387 | 5/1980 | Fed. Rep. of Germany | |
| 62405 | 5/1980 | Japan | 350/96.23 |
| 14804 | 1/1983 | Japan | 350/96.23 |
| 79202 | 5/1983 | Japan | 350/96.23 |

OTHER PUBLICATIONS

Horima et al., *Fiber and Integrated Optics*, vol. 3, Nos. 2-3, 1980 "Jelly-Filled Optical Cable".
Patent Abtsracts of Japan, vol. 7, No. 176, Aug. 4, 1983.
IECE-Japan-NCR, No. 1901, p. 7-344, 1981.
IECE-Japan-NCR, No. 366, p. 2-102, 1982.
IECE-Japan-NCR, No. 1810, p. 7-252, 1982.
IECE-Japan-NCR, No. 1811, p. 7-253, 1982.
IECE-Japan-NCR, No. S3-2, p. 576, 1976.

*Primary Examiner*—William L. Sikes
*Assistant Examiner*—Frank González
*Attorney, Agent, or Firm*—Armstrong, Nikaido, Marmelstein & Kubovcik

[57] ABSTRACT

An optical fiber cable comprising a water blocking layer, an optical fiber disposed inside the water blocking layer and a water blocking material filling the space between the water blocking layer and the optical fiber, the water blocking material having an apparent viscosity (as measured in accordance with JIS K 2220-1980, 5.15 at 40° C., and a shear rate of 10 sec.$^{-1}$) of lower than 25,000 poise and also having a worked penetration (as measured in accordance with JIS K 2220-1980, 5.3 at 25° C.) of 150 to 450.

8 Claims, 2 Drawing Figures

WATERPROOF OPTICAL FIBER CABLE

BACKGROUND OF THE INVENTION

1. Field of the Invention

The present invention relates to a waterproof optical fiber cable having incorporated therein a filler, namely a water blocking material, for preventing water from penetrating into the cable from outside.

2. Description of the Prior Art

When the sheath of an optical fiber cable ruptures locally, water naturally ingresses into the cable to impair the light transmission characteristics of the cable.

A system has been proposed for optical fiber cables for early detection of a break in the cable sheath and therefore ingress of water into the cable by monitoring the pressure of a gas filled in the interior of the cable to a high pressure. However, the proposed monitoring system is costly and requires expensive cable systems.

It has also been proposed to provide a water blocking layer beneath the cable sheath and fill the inside space of the layer with a water blocking material in order to directly prevent water from entering the interior of the cable even when a break occurs in the cable sheath, for instance, in JECE-JAPAN-NCR (The Institute of Electronics and Communication Engineers of Japan, National Convention Record) No. 1901 (Page 7-344) 1981, JECE-JAPAN-NCR No. 366 (Page 2-102), No. 1810 (Page 7-252) and No. 1811 (Page 7-253), 1982. The proposal has the advantage of being economical because the above monitoring system is made unnecessary. Water blocking materials known for use in optical fibers are solid or a highly viscous liquid at room temperature. Accordingly such a material is heated to melt or decrease its viscosity before being filled into the cable during the cable making process. The conventional water blocking material has the following drawbacks because the material invariably solidifies or becomes highly viscous while contracting when cooled after filling.

(1) Owing to contraction, a clearance occurs at the interface between the water blocking layer and the water blocking material or at the interface between the water blocking material and the optical fiber in the cable core, with the result that water, if entering the cable, runs through the clearance longitudinally of the cable.

(2) The optical fiber, which is thin, flexible and therefore easily bendable, is restrained by the water blocking material which rapidly becomes viscous or consistent when cooled after filling. Moreover, the contraction of the material causes microbending of the fiber and results in an increased light transmission loss. Especially when the cable is used during winter or in a cold climate, the material undergoes more marked contraction and produces a greater restraint to entail a further increased light transmission loss.

(3) Because the water blocking material is difficult to remove from the cable after solidification, it is difficult or requires a long period of time to make high precision cable connections.

SUMMARY OF THE INVENTION

An object of the present invention is to provide a novel waterproof optical fiber cable.

Another object of the present invention is to provide a waterproof optical fiber cable having a specific water blocking material which is easy to fill the interior of the cable at room temperature and is able to function in a superior water blocking effect.

The present invention provides an optical fiber cable comprising a water blocking layer, an optical fiber disposed inside the water blocking layer and a water blocking material filling the space between the water blocking layer and the optical fiber, the water blocking material having an apparent viscosity (as measured in accordance with JIS K2220-1980, 5.15 At 40° C., and at a shear rate of 10 s.$^{-1}$) of lower than $3 \times 10^4$ poise and also having a worked penetration (as measured in accordance with JIS K2220-1980, 5.3, at 25° C.) of 85 to 475.

DETAILED EXPLANATION OF THE INVENTION

Figure 1:
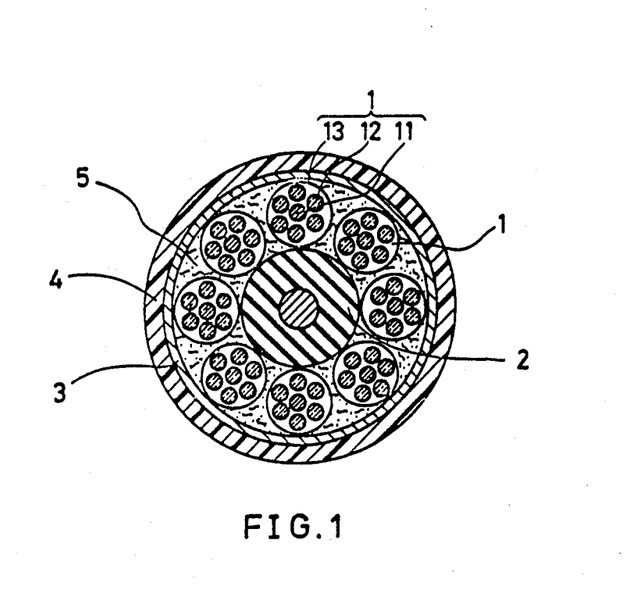
FIGS. 1 and 2 are sectional views showing embodiments of the present invention.
Figure 2:
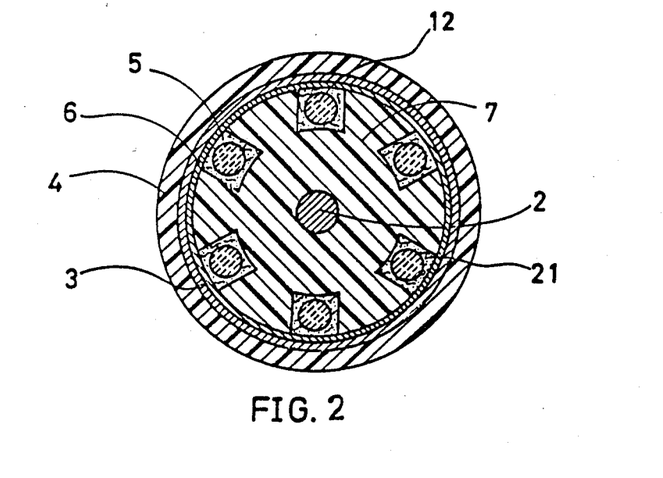

Referring to FIGS. 1 and 2 wherein like reference numerals designate similar parts throughout, there is shown optical fiber units 1 each comprising a single optical fiber or a strand of a multiplicity of optical fibers, a tension member 2, a water blocking layer 3 formed by enclosing an assembly of units 1 with a water blocking tape with a longitudinal lap or by winding a water blocking tape around the assembly, a sheath 4, and water blocking material 5 filling the space inside the water blocking layer 3.

The water blocking tape can be a tape made of a metal, such as copper, aluminum, lead or the like, or an organic high polymer having high water blocking ability, such as polyvinylidene chloride, polychlorotrifluoroethylene, biaxially oriented polypropylene or the like. It is desirable that the water brocking tape be at least single-faced with an adhesive layer to adhere the tape to itself at the lap and more preferably be double-faced with an adhesive layer to adhere the water blocking layer 3 to the sheath 4.

The sheath 4 itself may be of water blocking structure or may be made of a water blocking material so as to be serviceable also as a water blocking layer in place of the water blocking layer 3.

The tension member 2, which is not always needed, is preferably used because optical fibers generally have low mechanical strength. As shown in FIGS. 1 to 2, tension members 2 of various structures and materials are usable.

With reference to FIG. 1, the optical fiber unit 1 comprises an assembly of six optical fibers 12 arranged around a tension member 11 in the form of a string of organic polymer fiber, such as Kevlar ®. A holding tape 13 is wound around the assembly. An electrically insulated cable is used as the tension member 2, around which eight optical fiber units 1 are arranged.

With reference to FIG. 2 the tension member 2 consisting of a wire strand is provided thereon with a spacer 7 made of an organic polymer, such as polyethylene, polypropylene, nylon and the like. The spacer 7 has in its outer periphery a plurality of helical grooves 21 which are slightly larger in width and depth than the outside diameter of the optical fiber 12. The optical fiber is accommodated in each groove 21 as embedded in the water blocking material 5 filling the groove. A holding tape 6 of the foregoing structure is wound around the spacer 7 in the same manner as above. With the optical fiber cable of this construction, each optical fiber 12 is protected at three sides thereof by the wall of the spacer 7 defining its groove 21 and is restained at the outer side by the holding tape 6, while being enclosed in the water blocking material. Accordingly the optical fiber 12 is fully protected from external forces.

The water blocking materials to be used in the present invention have a worked penetration of 85 to 475 as measured in accordance with JIS K2220-1980, 5.3 at 25° C.

Materials less than 85 in worked penetration are hard and therefore need to be softened by heating before filling. Such materials tend to solidify at low temperatures. On the other hand, materials greater than 475 in worked penetration have excessive flowability so that when contained in a cable installed in a inclined or vertical position, the material will flow down the interior of the cable, possibly producing a head inside a lower cable portion that could cause a break in the sheath or creating a space within an upper cable portion. Accordingly it is preferable to use water blocking materials having a worked penetration of 100 to 450, more preferably 150 to 450, most preferably 200 to 400 at 25° C. More preferred greases are those having a worked penetration of 100 to 450, especially 120 to 385 at 25° C. and also having an unworked penetration of at least 100, at −30° C.

Besides above, the water blocking materials to be used in the present invention also have an apparent viscosity of lower than $3 \times 10^4$ poise as measured in accordance with JIS K2220-1980, 5.15 at 40° C. and at a shear rate of 10 s$^{-1}$. From a commercial standpoint of view it is very important to produce an optical fiber cable of the present invention in high efficiency without trouble. In order to achieve the object the water blocking material shall have the above-mentioned low apparent viscosity. A material greater than $3 \times 10^4$ poise in apparent viscosity requires a high pressure for being filled into the cable, and the high pressure causes microbending of optical fibers in the cable and results in an increased light transmission loss. On the other hand, when such a high viscous material is treated by a low pressure in order to avoid the above problem, the inside space of the cable is filled insufficiently with the material, and the cable is poor in water blocking characteristics.

From the above reason, a low viscous water blocking material having an apparent viscosity of lower than 27,000 poise, furthermore lower than 25,000 poise are preferably used in the present invention. Considering the easiness of handling material, the easiness of cable production, and the quality of the cable produced, most preferable water blocking materials are those having a worked penetration of 150 to 350 at 25° C. and an apparent viscosity of 100 to 6,000 c.St.

In the present invention materials of various chemical kinds, if satisfy the above requirments, may be used as a water blocking material. Among them, greases are a preferable example of the water blocking material.

It is generally well known that the grease is defined as a colloidal or micellar dispersion of solid thickener in a natural or synthetic organic liquid. The greases constituting water blocking materials useful for the present invention are those defined as above and having specific worked penetration and apparent viscosity excluding these which are too soft, solid or too viscous.

Examples of useful natural or synthetic organic liquids are as follows.
(1) Natural organic liquids

(1.1) Oils from petroleum, such as transformer oil, spindle oil, electrical insulating oil, machine oil etc.
(1.2) Animal and vegetable oils, such as rosin oil, caster oil, olive oil, whale oil etc.
(2) Synthetic organic liquids
(2.1) Hydrocarbon oils, such as polybutene, α-olefin oligomers, chlorinated paraffins, liquid rubbers etc.
(2.2) Glycols, such as polyethylene glycol, polypropylene glycol etc.
(2.3) Esters, such as dioctylsebacate, dioctyladipate, and other esters which are used as plasticizers for polyvinyl chloride etc.
(2.4) Other synthetic oils, such as di-2-ethylhexylphthalate, polydimethylsiloxane, polytrifluorochloroethylene etc.

Among those natural and synthetic liquids, those having a kinematic viscosity of 4 to 10,000 c.St., furthermore 20–1,000 c.St. at 40° C. are preferably used from the viewpoint of producing a grease which is easily filled into an optical fiber cable.

Examples of useful thickeners are as follows.
(1) Metallic soaps,

For example, organic acid salts of Ba, Sr, Zn, Pb, Cd, K, Na, Ca, Li, Al and like metals. Preferable organic acids are those having a carbon number of 1 to 7, such as formic acid, acetic acid, propionic acid, butyric acid, valeric acid, caproic acid, benzoic acid etc., and those having a carbon number of 8 to 36, such as caprylic acid, capric acid, laulic acid, myristic acid, palmitic acid, stearic acid, arachic acid, behenic acid, cerotic acid, montanic acid, oleic acid, linolic acid, linolenic acid, azelaic acid, sebacic acid, phthalic acid etc., and natural acids, such as palm fatty acid, tallow fatty acid, caster fatty acid, rapeseed fatty acid, fish oil fatty acid, whale oil fatty acid and their hydrogenated fatty acids etc.

Examples of metallic soaps are aluminum benzoate stearate, sodium acetate behenate, barium acetate stearate, calcium acetate butylate stearate, lithium sebacate 12-hydroxy-stearate caproate, sodium salt of hydrogenated tallow fatty acid, balium salt of hydrogenated tallow fatty acid, calcium salt of hydrogenated caster fatty acid, lithium salt of hydrogenated caster fatty acid and hydrogenated rapeseed fatty acid, potassium salt of acetic acid and tallow fatty acid, calcium salt of acetic acid and hydrogenated palm fatty acid, sodium salt of butyric acid, palm fatty acid and rapeseed fatty acid, aluminum benzoate behenate, aluminum salt of benzoic acid and hydrogenated fish oil fatty acid etc.
(2) Non-soaps
(2.1) Urea compounds, such as compounds expressed by the following general formula, wherein R$_1$, R$_2$, and R$_3$ are hydrocarbon radical, and the value of n is a positive integer of 1 to 6.

The urea compounds may, for example, be obtained by reacting a monoamine and/or a monoisocyanate with a diamine and/or a diisocyanate. In this reaction R$_1$ and R$_2$ of the above general formula are the residue of the monoamine or the monoisocyanate, and R$_2$ is the residue of the diamine or the diisocyanate.

Preferable carbon numbers of R$_1$ and R$_3$ are 3 to 22, especially 5 to 22. Preferable carbon number of R$_2$ is 2 to 22, especially 3 to 15.

A urea compound greater than 6 in n is too viscous, and a grease containing such a urea compound is also too viscous. Therefore preferable value of n is 1 to 4, especially 1 to 2. $R_1$, $R_2$ and $R_3$ are saturated or unsaturated aliphatic, aromatic or alicyclic hydrocarbon radicals. Examples of $R_1$ or $R_3$ are alkyl, alkenyl, aryl, arylalkyl, cycloalkyl, cycloalkylalkyl etc. Examples of $R_2$ are the bivalent radical corresponding to an above example of $R_1$ or $R_3$.

Examples of monoamines are aliphatic amines such as octylamine, nonylamine, decylamine, tridecylamine, stearylamine, laurylamine etc., alicyclic amines such as cyclohexylamine, dimethylcyclohexylamine, butylcyclohexylamine etc., aromatic amines such as xylidine, phenylpropylamine, phenylbutylamine, toluidine etc.

Examples of diamines are aliphatic diamines such as hexanediamine, octanediamine, hexadecanediamine, etc., alicyclic diamines such as diaminocyclohexane, diaminocyclooctane, dicyclohexylmethanediamine etc., aromatic diamines such as phenylenediamine, benzidin etc.

Examples of monoisocyanates are aliphatic monoisocyanates such as hexylisocyanate, hexadecylisocyanate etc., alicyclic monoisocyanates such as cyclohexylisocyanate, cyclooctylisocyanate etc., aromatic monoisocyanates such as phenylisocyanate, tolylisocyanate etc.

Examples of diisocyanates are aliphatic diisocyanates such as hexanediisocyanate, decanediisocyanate etc., aromatic diisocyanates such as phenylenediisocyanate, diphenylmethanediisocyanate etc.

Reaction of an isocyanate and an amine may be carried out in various ways. In one example a required amount of a diamine or a monoamine is added to an above-mentioned organic liquid dissolving a required amount of a diisocyanate and also, if necessary, a monoisocyanate, and the mixture is well-stirred at a reaction temperature of 10° to 200° C.

(2.2) Amino acid-type oil gelling agents such as N-lauroyl-L-glutamic acid-$\alpha,\beta$-n-butylamide etc.

(2.3) Cellulose derivatives such as the quaternary ammonium salt of cellulose, fatty acid esters of dextrin etc.

(2.4) Metal oxide gels such as aluminum oxide gel, titanium oxide gel, silica gel etc.

(2.5) Other thickeners such as bentonite, phthalocyanine, powders of organic resins etc.

When the thickener is used in an excessive amount, the apparent viscosity and the worked penetration of the greases become too large and too small, respectively. On the other hand, if the amount of the thickener is too small, the grease becomes flowable within the cable even at low temperatures, giving rise to the problems to be described above.

The amount of the thickener to be used for preparing a grease which satisfies the above two requirements, though more or less varied by the kind of thickener, as well as the kind and the viscosity of organic liquid, is in general 1 to 50 parts by weight, preferably 2 to 40 parts by weight, more preferably 3 to 35 parts by weight per 100 parts by weight of the organic liquid.

Examples of greases to be suitably used in the present invention are as follows.

(1) Greases containing, as a thickener, at least one member selected from the group consisting of sodium soaps, potassium soaps, and calcium soaps. Examples of these soaps are the sodium salt of tallow fatty acid, sodium acetate behenate, potassium salt of rapeseed fatty acid, potassium salt of acetic acid and tallow fatty acid, calcium salt of hydrogenated caster fatty acid etc.

Greases of this group have an advantage of water absorption. Therefore, even when the sheath of the cable ruptures locally and water ingresses into the cable, a water blocking material comprising a grease of this group will absorp and catch the water to prevent the water from running through the inside of the cable.

(2) Greases containing, as an organic liquid, at least one member selected from the group consisting of glycols and hydrocarbon oils which contain an element, other than carbon and hydrogen, of less than 1% by weight. Examples of these organic liquids are polyethyleneglycol, polybutene, $\alpha$-olefin oligomers etc., and examples of these greases are silica gel grease, lithium soap grease, aluminum soap grease, urea grease etc.

Greases of this group have a good compatibility with urethane resins, epoxy resins and the like due to their low polarity, and therefore are suitably used for the cable each of whose optical fibers has an outer layer comprising such a resin.

(3) Greases comprising a metal soap and an organic liquid, preferably a mineral oil, having a pour point of lower than 0° C., and having an unworked penetration of greater than 85 at 0° C., or greases comprising an organic liquid having a viscosity of 2 to 1,000 c.St. at 40° C. and 2 to 15 parts by weigh, per 100 parts by weight of the organic liquid of lithium or aluminum soaps which are a salt of an organic acid having a carbon number of 4 to 40, and having a worked penetration of 130 to 475 at 25° C.

Examples of the greases are lithium sebacate 12-hydroxy-stearate caproate grease, lithium behenate grease, aluminum benzoate stearate grease, aluminum distearate grease.

Greases of this group are sufficiently fluid to make the filling operation of grease easy during the cable making process. After filling, they still retain satisfactory softness even when cooled to a low temperature of below 0° C., and therefore the grease is unlikely to restrain the optical fiber, rendering the fiber free of microbending during use. Furthermore the greases are consistent and do not or hardly flow down the interior of the cable.

(4) Greases comprising a hydrocarbon oil having an aniline point of 50° to 128° C., preferably 60° to 120° C. and 4 to 40 parts by weight, per 100 parts by weight of the hydrocarbon oil, of at least one member selected from the metallic soaps consisting of (a) soaps of Ba, Sr, Zn, Pb, Cd, K, Na, Li, Ca, and Al with an organic acid having a carbon number of 1 to 7 and an organic acid having a carbon number of 8 to 36, (b) soaps of Al with benzoic acid and an organic acid having a carbon number of 8 to 36, and (c) soaps of a metal with an organic acid having a carbon number of 8 to 36. Preferably examples of the hydrocarbon oil are 2 to 1,000 c.St., especially 8 to 600 c.St. in kinematic viscosity at 40° C.

Greases of this group are very stable because their components, that is the hydrocarbon oil and the thickener are inseparable. Thus, by using a grease of this group, it may be obtained an optical fiber cable which can maintain its initial light transmission characteristics for a long period of time.

(5) Urea greases comprising an organic liquid having a kinematic viscosity of 10 to 50,000 c.St., preferably 50 to 1,000 c.St. at 40° C., containing 1 to 30% by weight of an urea compound above mentioned.

Greases of this group are excellent in electrical insulating characteristics, and therefore are suitably used for a complex cable of an optical fiber and an electrical insulating wire.

Other useful greases are disclosed by Hiroshi Horiguchi in "Lubricants and Greases", pages 402–419, Sankyoshuppan Co., Ltd., Tokyo, February 1970.

In the production of the optical fiber cable of the present invention the spaces between the optical fibers or the units thereof may be filled with a water blocking material in various ways. For example, in one way the water blocking material is furnished onto the optical fiber units and the units are stranded around a tension member or a spacer as shown in FIG. 2, while the material fills the spaces. In another way optical fiber units are stranded around a tension member, and then the strand thus assembled is passed through a chamber into which the water blocking material is continuously pumped by a pressure of about 0.5 to 10 kg/cm$^2$-G preferably 1 to 5 kg/cm$^2$-G. The spaces between the optical fiber units are filled with the material during passing through the chamber.

The water blocking material, which fills the spaces, exerts a force on the optical fibers. The force, however, is too small not to substantially cause microbending of the optical fibers because the water blocking material to be used in the present invention has a low apparent viscosity as mentioned above.

The present invention will be described in greater detail by reference to the following Examples, together with Comparative Examples. All parts and percents are by weight, and the physical properties of materials was evaluated by the following methods unless otherwise indicated.

Worked penetration; JIS K 2220-1980, 5.3, at 25° C.,
Unworked penetration; JIS K 2220-1980, 5.3, at 0° C.,
Apparent viscosity; JIS K 2220-1980, 5.15, at 40° C., at shear rate of 10 s.$^{-1}$,
Kinematic viscosity; JIS K 2283-1980,
Aniline point; JIS K 2256-1980,
Pour point; JIS K 2269-1980,
Oil separation; JIS K 2220-1980, 5.7,
Water absorption; Four cm length of the bottom end portion of a glass tube 7.5 mm in inner diameter and 1 m in length vertically positioned was filled with a water blocking material to be tested, and the glass tube was filled with water to make a water column of 80 cm on the water blocking material.
In order to prevent the water in the glass tube from evaporation the upper end of the glass tube was sealed by a rubber plug having a small through hole for pressure balance. After the lapse of 240 hours from the formation of the water column, measurements were conducted to determine the decrease of water amount ($\mu$l) in the water column, and the water amount ($\mu$l) leaked from the bottom of the water blocking material in the glass tube (hereinafter the water amount being abbreviated to water leak). Water absorption ($\mu$l) is defined as the difference of the decrease of water amount in the water column and the water leak.
Dielectric constant; JIS C 2101-1982, 21
Volume resistivity; JIS C 2101-1982, 22

Preparations of water blocking materials (WB-1 to WB-56) used in Examples

WB-1;

Two hundred fifty parts of stearic acid and 500 parts of a hydrocarbon oil (kinematic viscosity at 40° C.: 162.6 c.St.) were mixed and heated at 90° C. The mixture was admixed with a dispersion consisting of 39.5 parts of lithium hydroxide dispersed in 150 parts of the same hydrocarbon oil as above, and saponified with stirring. The resultant was heated at 150° C. to remove water, and was admixed with 350 parts of the same hydrocarbon oil as above with stirring, thenafter heated at 220° C., cooled, and finally milled. The lithium soap grease, thus obtained, was 2,900 poise in apparent viscosity and 196 in worked penetration.

WB-2;

Calcium soap grease (apparent viscosity: 4,700 poise, worked penetration; 238) was prepared by using 220 parts of hydrogenated tallow fatty acid, 1,000 parts of a hydrocarbon oil, 80 parts of acetic acid, and 82.5 parts of calcium hydroxide.

WB-3;

FIfty parts of a poly-α-olefin (kinematic viscosity at 40° C.: 86.4 c.St.) was admixed with 4.5 parts of silica gel, and stirred, milled, admixed with 50 parts of the same poly-α-olefin as above, and then again milled to obtain silica gel grease of 107 poise in apparent viscosity and 367 in worked penetration,

WB-4;

Thirty two point five parts of hydrogenated rapeseed fatty acid, 97.5 parts of hydrogenated caster fatty acid and 350 parts of α-olefin origomer (kinematic viscosity at 40° C.: 86.4 c.St.) were mixed and heated at 90° C. The mixture was admixed with a water solution of lithium hydroxide whose 44.7 parts is dissolved in 70 parts of water, and saponified with stirring. The resultant was heated at 150° C. to remove water, and was admixed with 520 parts of the same α-olefin origomer as above, heated at 220° C. with stirring, gradually cooled, admixed with 10 parts of 4,4'-thiobis(3-methyl-6-t-butylphenol) and milled to obtain lithium soap grease of 840 poise in apparent viscosity and 277 in worked penetration.

WB-5 to WB-36;

The similar reaction used in the preparation of WB-4 was repeated using a variety of materials to prepare WB-5 to WB-12 shown in Table 1, and WB-13 to WB-36 shown in Table 2.

TABLE 1

| | Water Blocking Material Ingredient (parts by weight) | | | | | Characteristics | |
|---|---|---|---|---|---|---|---|
| | Organic Liquid | | | Soap | | Worked Penetration | Apparent Viscosity (poise) |
| No. | Kind | Viscosity, (c.St.) | Parts | Kind | Parts | | |
| WB-5 | Diester oil | 7.65 | 100 | Aluminum stearate benzoate | 28 | 196 | 223 |
| WB-6 | Mineral oil | 165.2 | 100 | Lithium 12-hydroxy-stearate azelaate | 11 | 331 | 295 |
| WB-7 | Mineral oil | 312 | 100 | Aluminum dibehenate | 12 | 258 | 850 |
| WB-8 | Mineral | 135 | 100 | Lithium salt of | 18 | 231 | 1,750 |

TABLE 1-continued

| | Water Blocking Material | | | | | | |
|---|---|---|---|---|---|---|---|
| | Ingredient (parts by weight) | | | | | Characteristics | |
| | Organic Liquid | | | Soap | | Worked Penetra-tion | Apparent Viscosity (poise) |
| No. | Kind | Viscosity, (c.St.) | Parts | Kind | Parts | | |
| | oil | | | wool fatty acid (C$_{18}$–C$_{30}$) | | | |
| WB-9 | Mineral oil | 936 | 100 | Lithium behenate | 14 | 206 | 2,840 |
| WB-10 | Mineral oil | 274 | 100 | Lithium stearate | 33.5 | 171 | 10,700 |
| WB-11 | Hydro-carbon oil | 162.5 | 100 | Aluminum distearate | 21 | 275 | 480 |
| WB-12 | Poly-olefin | 86.4 | 100 | Aluminum stearate benzoate | 16.5 | 214 | 670 |

TABLE 2

| | Water Brocking Material | | | | | | | | |
|---|---|---|---|---|---|---|---|---|---|
| | Ingredient (parts by weight) | | | | | | Characteristics | | |
| | Hydrocarbon Oil | | | | Soap | | Worked Penetration | Oil Separation (wt. %) | Apparent Viscosity (poise) |
| No. | Aniline Point (°C.) | Vis-cosity (C.St.) | Parts | Metal | Organic Acid | Parts | | | |
| WB-13 | 80 | 138.6 | 100 | Na | Acetic acid, Hydrogenated rape-seed fatty acid | 18 | 296 | 0.5 | 4,100 |
| WB-14 | 88 | 86.5 | 100 | K | Acetic acid, Hydrogenated tallow fatty acid | 25 | 237 | 0.4 | 6,800 |
| WB-15 | 79 | 151.0 | 100 | Ca | Acetic acid, Hydrogenated palm fatty acid | 12 | 395 | 9.3 | 1,730 |
| WB-16 | 103 | 142.6 | 100 | Ba | Acetic acid, Stearic acid | 18 | 362 | 4.3 | 2,180 |
| WB-17 | 106 | 560.8 | 100 | Na | Butylic acid, Palm fatty acid, Rapeseed fatty acid | 12.5 | 250 | 0.2 | 1,500 |
| WB-18 | 68 | 11.8 | 100 | Na | Benzoic acid, Rape-seed fatty acid | 33.5 | 220 | 0.7 | 336 |
| WB-19 | 65 | 151.0 | 100 | Na | Caproic acid, Hy-drogenated fish oil fatty acid | 5 | 390 | 7.6 | 120 |
| WB-20 | 100 | 542.1 | 100 | Al | Benzoic acid, Behenic acid | 8 | 318 | 2.8 | 180 |
| WB-21 | 70 | 336.3 | 100 | Na | Caprylic acid, Behenic acid | 22 | 200 | 0.0 | 3,500 |
| WB-22 | 65 | 236.8 | 100 | K | Stearic acid | 15 | 252 | 0.5 | 170 |
| WB-23 | 85 | 151.0 | 100 | Li | Oleic acid | 15 | 228 | 0.0 | 1,850 |
| WB-24 | 78 | 8.9 | 100 | Ba | Linolic acid | 28 | 323 | 7.8 | 85 |
| WB-25 | 68 | 325.0 | 100 | Ca | Hydrogenated Rape-seed fatty acid | 16.5 | 240 | 0.5 | 2,300 |
| WB-26 | 86 | 8.6 | 100 | Li | Hydrogenated Rape-seed fatty acid, Hydrogenated palm fatty acid | 23.5 | 210 | 0.0 | 160 |
| WB-27 | 78 | 151.0 | 100 | Al | Stearic acid | 26.5 | 150 | 0.3 | 7,000 |
| WB-28 | 118 | 6.7 | 100 | Al | Stearic acid | 40 | 348 | 18.5 | 83 |
| WB-29 | 113 | 74 | 100 | Al | Benzoic acid, Behenic acid | 9 | 287 | 0.1 | 230 |
| WB-30 | 112 | 48 | 100 | K | Acetic acid, Tallow fatty acid | 25 | 205 | 0.0 | 470 |
| WB-31 | 130 | 756.8 | 100 | Na | Caproic acid, Hy-drogenated fish oil fatty acid | 6 | 366 | 38.1 | 260 |
| WB-32 | 114 | 108.7 | 100 | Ca | Hydrogenated palm fatty acid | 33.5 | 160 | 0.0 | 630 |
| WB-33 | 128 | 878.3 | 100 | Li | Hydrogenated rape-seed fatty acid, Hydrogenated palm fatty acid | 10 | 336 | 14.6 | 530 |
| WB-34 | 133 | 878.3 | 100 | Ba | Acetic acid, Stearic acid | 18 | 438 | 33.7 | 760 |
| WB-35 | 56 | 82.5 | 100 | Na | Caprylic acid, Behenic acid | 11 | 286 | 0.2 | 1,150 |
| WB-36 | 58 | 67.9 | 100 | Ca | Hydrogenated palm | 11 | 259 | 0.3 | 910 |

TABLE 2-continued

Water Brocking Material

| Ingredient (parts by weight) | | | | | | Characteristics | | |
|---|---|---|---|---|---|---|---|---|
| Hydrocarbon Oil | | | Soap | | | Worked Penetration | Oil Separation (wt. %) | Apparent Viscosity (poise) |
| No. | Aniline Point (°C.) | Viscosity (C.St.) | Parts | Metal | Organic Acid fatty acid | Parts | | | |

WB-37;
Calcium soap grease of 338 in worked penetration, 1,280 poise in apparent viscosity, 125 μl in water absorption, and 0 μl in water leak, was prepared by using 99.5 parts of hydrogenated tallow fatty acid, 1,200 parts of hydrocarbon oil (162.6 c.St. at 40° C.), 11.4 parts of acetic acid, and 23.3 parts of calcium hydroxide.

WB-38;
Sodium soap grease of 207 in worked penetration, 3,200 poise in apparent viscosity, 133 μl in water absorption, and 0 μl in water leak was prepared by using 220 parts of hydrogenated rapeseed fatty acid, 85 parts of hydrogenated caster fatty acid, 1,000 parts of poly-α-olefin (86.5 c.St. at 40° C.), and 39 parts of sodium hydroxide.

WB-39;
Potassium soap grease of 205 in worked penetration, 8,600 poise in apparent viscosity, 143 μl in water absorption and 0 μl in water leak was prepared by using 300 parts of hydrogenated tallow fatty acid, 1,200 parts of hydrocarbon oil (162.3 c.St. at 40° C.), and 61.6 parts of potassium hydroxide.

WB-40;
Twenty point six gram (80 m mol) of diphenylmethanediisocyanate was dissolved in 500 g of hydrocarbon oil (101.1 c.St. at 40° C.) by heating at 90° C. While, 44.4 g (164 m mol) of stearylamine was dissolved in 435 g of hydrocarbon oil (484.9 c.St. at 40° C.), by heating at 90° C. Both of the solutions were mixed with vigorous stirring while being heated at 180° C. The mixture was then cooled at 80° C., and passed through a colloid-mill to prepare urea grease.

WB-41;
Urea grease was prepared by using 25.0 g (97 m mol) of diphenylmethanediisocyanate, 13.2 g (102 m mol) of octylamine, 26.8 g (100 m mol) of stearylamine, and 735 g of hydrocarbon oil (kinematic viscosity at 40° C.: 101.1 c.St.).

WB-42;
Urea grease was prepared with 26.5 g (103 m mol) of diphenylmethanediisocyanate, 10.5 g (107 m mol) of cycrohexylamine, 28.4 g (105 m mol) of stearylamine, and 735 g of hydrocarbon oil (kinematic viscosity at 40° C.: 484.9 c.St.).

WB-43;
Urea grease was prepared with 50.0 g (194 m mol) of diphenylmethanediisocyanate, 13.8 g (66 m mol) of cycrohexylmethanediamine, 9.4 g (96 m mol) of cycrohexylamine, 27.0 g (101 m mol) of stearylamine, and 600 g of hydrocarbon oil (kinematic viscosity at 40° C.: 218.6 c.St.).

WB-44;
Urea grease was prepared with 22.2 g (89 m mol) of myristilamine, and 940 g of polydimethylsiloxane oil (kinematic viscosity at 40° C.: 100 c.St.).

WB-45;
Urea grease was prepared by using 24.0 g (96 m mol) of diphenylmethanediisocyanate, 25.6 g (96 m mol) of stearylamine, 10.4 g (96 m mol) of m-toluidine, and 940 g of polybutene (kinematic viscosity of 115.7 c.St.).

WB-46;
Urea grease was prepared by using 60.5 g (242 m mol) of diphenylmethanediisocyanate, 89.5 g (484 m mol) of laurylamine, and 850 g of di-2-ethylhexylsebacate.

Characteristics of WB-40 to WB-46 were shown in Table 3.

TABLE 3

| | Characteristics of Water Blocking Material | | | | |
|---|---|---|---|---|---|
| No. | Worked Penetration | Apparent Viscosity (poise) | Oil Separation (wt. %) | Dielectric Constant | Volume Resistivity (Ω·cm) |
| WB-40 | 368 | 180 | 2.6 | 2.25 | 2.8 × 10¹³ |
| WB-41 | 362 | 190 | 2.2 | 2.25 | 1.2 × 10¹³ |
| WB-42 | 272 | 210 | 2.3 | 2.25 | 6.5 × 10¹³ |
| WB-43 | 292 | 230 | 2.8 | 2.25 | 2.0 × 10¹³ |
| WB-44 | 288 | 200 | 2.5 | 2.75 | 7.5 × 10¹³ |
| WB-45 | 281 | 260 | 1.7 | 2.23 | 6.4 × 10¹³ |
| WB-46 | 321 | 30 | 3.8 | 3.85 | 6.3 × 10¹³ |

WB-47 to WB-56;
WB-47 was prepared by the manner similar to the preparation of WB-1 using 350 parts of hydrogenated tallow fatty acid ($C_{14}$ to $C_{22}$), 1,240 parts of hydrocarbon oil (kinematic viscosity at 40° C.: 261.3 c.St., pour point: −2.5° C.), 62 parts of lithium hydroxide, and 10 parts of diphenylamine (antioxidant). WB-48 to WB-56 were also prepared in the similar manner to that of WB-47.

The component and the characteristics of WB-47 to WB-56 were shown in Table 4.

Water blocking materials (WB-57 to WB-60) used in Comparative Example

WB-57;
Compound #5B (melting point: 105° C.) of Witco Co. (U.S.A.).

WB-58;
Sodium soap grease of 31,000 poise in apparent viscosity and 100 in worked penetration, prepared by using hydrogenated tallow fatty acid.

WB-59;
Lithium soap grease of 33,000 poise in apparent viscosity and 78 in worked penetration, prepared by using rapeseed fatty acid.

WB-60;
Urea grease of 35,000 poise in apparent viscosity and 150 in worked penetration.

TABLE 4

| | Water Brocking Material | | | | | | | |
|---|---|---|---|---|---|---|---|---|
| | Ingredient (parts by weight) | | | | | Characteristics | | |
| | Hydrocarbon Oil | | | Soap | | Penetration | | Apparent |
| | Viscosity | Pour Point | | | | Unworked | Worked | Viscosity |
| No. | (c.St.) | (°C.) | Parts | Kind | Parts | at 0° C. | at 25° C. | (poise) |
| WB-47 | 261.3 | −2.5 | 100 | Sodium salt of Hydrogenated tallo fatty acid | 35 | 105 | 145 | 18,000 |
| WB-48 | 218.6 | −5.0 | 100 | Lithium salt of Hydrogenated palm fatty acid | 24 | 132 | 183 | 9,000 |
| WB-49 | 162.5 | −7.5 | 100 | Potassium salt of Hydrogenated rapeseed fatty acid | 30.3 | 110 | 167 | 12,500 |
| WB-50 | 137.7 | −10.0 | 100 | Sodium terephthalate | 25.1 | 160 | 203 | 8,500 |
| WB-51 | 96.3 | −12.5 | 100 | Aluminum stearate | 20.3 | 204 | 241 | 1,860 |
| WB-52 | 483.2 | −15.0 | 100 | Bentnite | 12.2 | 236 | 270 | 1,320 |
| WB-53 | 245.1 | −17.5 | 100 | Diurea | 10.0 | 264 | 297 | 770 |
| WB-54 | 137.4 | −20.0 | 100 | Silica gel | 6.8 | 292 | 328 | 215 |
| WB-55 | 162.5 | −22.5 | 100 | Aluminum benzoate stearate | 5.2 | 348 | 374 | 95 |
| WB-56 | 86.5 | −25.0 | 100 | Calcium salt of acetic acid and hydrogenated tallow fatty acid | 23.0 | 207 | 281 | 5,500 |

EXAMPLES 1 TO 56, COMPARATIVE EXAMPLES 1 TO 4

Six optical fibers, each consisting of a GI-type optical fiber having a core diameter of 50 μm and a cladding diameter of 125 μm and covered with a silicone primary coat, a silicone rubber buffer and a nylon jacket having a outer diameter of 0.9 mm were stranded, with 15 cm pitch, around a tension member of piano wire of 1 mm$^\phi$. A stretched polyethylene tape (thickness: 50 μm, width; 2.5 mm) was applied over the strand by winding around the strand with a tape gap of 2.6 cm to prepare an optical fiber core of about 4.0 mm in outer diameter. Eight of such optical fiber units were stranded, with 40 cm pitch, around a tension member consisting of a strand of 7 piano wires (each piano wire: 1.2 mm in diameter) and polyethylene layer (outer diameter: 5.0 mm) applied on the strand. The assembly thus obtained and having an outer diameter of 13 mm was passed continuously through a tapered cylinder having many orifices in its side wall, each of whose diamter is 5 mm, while a water blocking material was introduced into the inside of the cylinder maintained at room temperature through the orifices by a pressure of 5 kg/cm$^2$-G to fill the spaces between the units and between the optical fibers of the assembly.

Aluminum laminate tape of 200 μm in thickness, 55 mm in width and having a layer of an ethylene-vinyl acetate copolymer adhesive on one side of its surfaces, was wrapped around the resulting assembly with a longitudinal lap to form a water blocking layer, which was then covered with a polyethylene sheath of 2.5 mm in thickness. Thus, an optical fiber cable of 20 mm in outer diameter was produced continuously in line speed of 30 m/min.

The water blocking material used in each Example and Comparative Example was treated and filled at room temperature, except that the water blocking material, WB-57, used in Comparative Example 1 which is solid at room temperature and was therefore heated at 110° C. and employed in filling process.

Table 5 shows the water blocking materials used in Examples and Comparative Examples, state of filling of water blocking material and the characteristics of optical fiber cables. Those characteristics are measured by the following methods.

State of filling of water blocking material:

A cable test piece 10 m in length was dissected to inspect the condition of filling of water blocking material. In case where any space is not filled with a water blocking material was not found between the units and between the optical fibers, the water blocking material was evaluated as "good" in state of filling. On the other hand, the water blocking material, if such spaces were found, was evaluated as "inferior".

Loss-wave length characteristics:

A cable test piece 500 m in length and wound on a drum was maintained at 25° C., and the loss was measured at 0.85 μm and 1.30 μm by the CUT BACK method.

Loss increase by temperature:

After the above measurement, the same cable test piece was tested for loss characteristics at temperatures of −30° C. and 60° C. at 0.85 μm by the CUT BACK method, and the difference between the loss at −30° C. or 60° C. and the loss at 25° C. at 0.85 μm was obtained.

Water blocking effect:

The sheath and the water blocking layer were removed over a length of 25 mm from a 2 m long cable test piece approximately at its midportion. A vertical polyethylene pipe filled with water to a height of 1,000 mm was connected to the exposed core assembly portion. After allowing the test piece to stand for 14 days, the test piece was checked for distance of water penetration from the midportion.

Loss increase by bending:

All of the optical fiber in a cable test piece 2 m in length were connected in series, and the both ends of cable were sealed with epoxy resin. The cable test piece was bent at 25° C. 10 times repeatedly in 180 degree around a mandrel 200 mm in radius, while a light of 0.85 μm was passed through the connected optical fiber, and the total loss increase after the 10 times bending was found by measuring the change of light level in a receiver.

According to the value of loss increase per 2 m of the optical fiber, it was rated as follows;

| Rate | Loss increase (dB) |
|---|---|
| Excellent; | less than 0.15, |
| Good; | from 0.15 to less than 0.3, |
| Fair; | from 0.3 to less than 1.0, |
| Poor; | 1.0 or more. |

COMPARATIVE EXAMPLES 5 TO 7

Optical fiber cables of Comparative Examples were produced by the method similar to those in Comparative Examples 2 to 4, respectively, except that the water blocking material employed in each Comparative Example was introduced into the inside of the cylinder by a pressure of 10 kg/cm$^2$-G.

TABLE 5

| Example or Comparative Example | Water Blocking Material | Filling State of Water Blocking Material | Characteristics of Optical Fiber Cable | | | | | |
|---|---|---|---|---|---|---|---|---|
| | | | Loss-Wave Length at 25° C. | | Loss Increase by Temp. at 0.85 μm | | Water Blocking Effect (mm) | Loss Increase by Bending |
| | | | at 0.85 μm (dB/km) | at 1.30 μm (dB/km) | at −30° C. (dB/km) | at 60° C. (dB/km) | | |
| Ex. 1 | WB-1 | Good | 2.3 | 0.53 | +0.4 | +0.1 | 240 | Excellent |
| Ex. 2 | WB-2 | " | 2.2 | 0.52 | +0.5 | ±0 | 200 | " |
| Ex. 3 | WB-3 | " | 2.4 | 0.53 | +0.3 | ±0 | 270 | " |
| Ex. 4 | WB-4 | " | 2.4 | 0.55 | +0.3 | ±0 | 160 | " |
| Ex. 5 | WB-5 | " | 2.3 | 0.53 | +0.4 | +0.1 | 140 | " |
| Ex. 6 | WB-6 | " | 2.4 | 0.57 | +0.5 | +0.2 | 110 | " |
| Ex. 7 | WB-7 | " | 2.5 | 0.62 | +0.6 | +0.1 | 80 | " |
| Ex. 8 | WB-8 | " | 2.6 | 0.65 | +0.4 | ±0 | 90 | " |
| Ex. 9 | WB-9 | " | 2.7 | 0.71 | +0.5 | ±0 | 110 | " |
| Ex. 10 | WB-10 | " | 2.9 | 0.85 | +0.6 | ±0 | 120 | Good |
| Ex. 11 | WB-11 | " | 2.3 | 0.56 | +0.5 | ±0 | 140 | Excellent |
| Ex. 12 | WB-12 | " | 2.2 | 0.56 | +0.4 | ±0 | 230 | " |
| Ex. 13 | WB-13 | " | 2.5 | 0.58 | +0.4 | +0.3 | 230 | " |
| Ex. 14 | WB-14 | " | 2.5 | 0.60 | +0.2 | ±0 | 430 | " |
| Ex. 15 | WB-15 | " | 2.3 | 0.58 | +0.5 | +0.1 | 190 | " |
| Ex. 16 | WB-16 | " | 2.5 | 0.60 | +0.4 | +0.2 | 120 | " |
| Ex. 17 | WB-17 | " | 2.4 | 0.55 | +0.3 | ±0 | 220 | " |
| Ex. 18 | WB-18 | " | 2.5 | 0.65 | +0.4 | ±0 | 180 | " |
| Ex. 19 | WB-19 | " | 2.2 | 0.50 | +0.2 | ±0 | 200 | " |
| Ex. 20 | WB-20 | " | 2.4 | 0.59 | +0.2 | +0.1 | 110 | " |
| Ex. 21 | WB-21 | " | 2.5 | 0.65 | +0.5 | ±0 | 170 | " |
| Ex. 22 | WB-22 | " | 2.4 | 0.60 | +0.1 | +0.1 | 140 | " |
| Ex. 23 | WB-23 | " | 2.4 | 0.55 | +0.2 | +0.1 | 180 | " |
| Ex. 24 | WB-24 | " | 2.3 | 0.50 | +0.2 | ±0 | 230 | " |
| Ex. 25 | WB-25 | " | 2.4 | 0.50 | +0.4 | ±0 | 210 | " |
| Ex. 26 | WB-26 | " | 2.5 | 0.55 | +0.4 | ±0 | 120 | " |
| Ex. 27 | WB-27 | " | 2.7 | 0.65 | +0.5 | +0.1 | 110 | Good |
| Ex. 28 | WB-28 | " | 2.3 | 0.55 | +0.1 | ±0 | 180 | Excellent |
| Ex. 29 | WB-29 | " | 2.5 | 0.55 | +0.2 | ±0 | 130 | " |
| Ex. 30 | WB-30 | " | 2.6 | 0.63 | +0.4 | ±0 | 150 | " |
| Ex. 31 | WB-31 | " | 2.3 | 0.48 | +0.1 | ±0 | 230 | " |
| Ex. 32 | WB-32 | " | 2.6 | 0.55 | +0.4 | ±0 | 130 | " |
| Ex. 33 | WB-33 | " | 2.3 | 0.45 | +0.2 | +0.1 | 220 | " |
| Ex. 34 | WB-34 | " | 2.2 | 0.40 | +0.1 | ±0 | 210 | " |
| Ex. 35 | WB-35 | " | 2.4 | 0.45 | +0.2 | ±0 | 200 | " |
| Ex. 36 | WB-36 | " | 2.4 | 0.43 | +0.3 | ±0 | 180 | " |
| Ex. 37 | WB-37 | " | 2.2 | 0.42 | +0.1 | ±0 | 240 | " |
| Ex. 38 | WB-38 | " | 2.5 | 0.55 | +0.3 | ±0 | 110 | " |
| Ex. 39 | WB-39 | " | 2.6 | 0.56 | +0.4 | +0.1 | 90 | Good |
| Ex. 40 | WB-40 | " | 2.5 | 0.55 | +0.3 | +0.1 | 120 | Excellent |
| Ex. 41 | WB-41 | " | 2.4 | 0.48 | +0.2 | +0.1 | 180 | " |
| Ex. 42 | WB-42 | " | 2.3 | 0.45 | +0.3 | +0.1 | 160 | " |
| Ex. 43 | WB-43 | " | 2.4 | 0.50 | +0.2 | ±0 | 90 | " |
| Ex. 44 | WB-44 | " | 2.3 | 0.50 | +0.1 | ±0 | 120 | " |
| Ex. 45 | WB-45 | " | 2.3 | 0.49 | +0.2 | +0.1 | 140 | " |
| Ex. 46 | WB-46 | " | 2.3 | 0.45 | +0.2 | ±0 | 160 | " |
| Ex. 47 | WB-47 | " | 2.6 | 0.60 | +0.4 | +0.1 | 90 | Good |
| Ex. 48 | WB-48 | " | 2.6 | 0.60 | +0.4 | +0.1 | 100 | " |
| Ex. 49 | WB-49 | " | 2.6 | 0.60 | +0.4 | +0.1 | 110 | " |
| Ex. 50 | WB-50 | " | 2.5 | 0.51 | +0.2 | ±0 | 190 | Excellent |
| Ex. 51 | WB-51 | " | 2.4 | 0.45 | +0.2 | ±0 | 200 | " |
| Ex. 52 | WB-52 | " | 2.3 | 0.40 | +0.1 | ±0 | 210 | " |
| Ex. 53 | WB-53 | " | 2.3 | 0.45 | +0.1 | ±0 | 240 | " |
| Ex. 54 | WB-54 | " | 2.3 | 0.45 | +0.1 | ±0 | 220 | " |
| Ex. 55 | WB-55 | " | 2.2 | 0.40 | +0.1 | ±0 | 230 | " |
| Ex. 56 | WB-56 | " | 2.4 | 0.50 | +0.3 | +0.1 | 110 | " |
| Co. Ex. 1 | WB-57 | Inferior | 3.5 | 1.0 | +7.0 | +0.8 | Note 1 | Poor |
| Co. Ex. 2 | WB-58 | " | 4.0 | 1.3 | +1.5 | +0.5 | Note 2 | Good |
| Co. Ex. 3 | WB-59 | " | 5.3 | 2.0 | +4.2 | +1.0 | Note 3 | Poor |
| Co. Ex. 4 | WB-60 | " | 3.2 | 1.1 | +3.0 | +0.5 | Note 2 | Good |

Note 1: Water leaked from each end of the cable after the lapse of one hour.
Note 2: Water leaked from each end of the cable after the lapse of one week.
Note 3: Water leaked from each end of the cable after the lapse of three hours.

Though the inside of each cable was well filled with the water blocking material, the light transmission loss at 0.85 μm at 25° C. of each cable was about 1.0 dB/km to 3.5 dB/km greater than that of the corresponding Comparative Example; that is, the values of Co. Ex. 5 (water blocking material: WB-58), Co. Ex. 6 (water blocking material: WB-59), and Co. Ex. 7 (water blocking material: WB-60) were 5.5 dB/km, 8.5 dB/km, and 5.8 dB/km, respectively.

The increase of the light transmission loss is undoubtedly caused by microbending of the optical fibers due to the high pressure of water blocking material during the cable making procedure.

What is claimed is:

1. An optical fiber cable comprising a water blocking layer, at least one optical fiber disposed inside the water blocking layer and a water blocking material filling the space between the water blocking layer and the optical fiber, the blocking material having an apparent viscosity (as measured in accordance with JIS K 2220-1980, 5.15, at 40° C., at a shear rate of 10 sec.$^{-1}$) of lower than 25,000 poise and also having a worked penetration (as measured in accordance with JIS K 2220-1980, 5.3, at 25° C.) of 150 to 450.

2. An optical fiber cable as defined in claim 1 wherein the water blocking material has an apparent viscosity of 100 to 6,000 poise and a worked penetration of 150 to 350.

3. An optical fiber cable as defined in claim 1 wherein the water blocking material is a grease containing, as a thickener, at least one member selected from the group consisting of sodium soaps, potassium soaps, and calcium soaps.

4. An optical fiber cable as defined in claim 1 wherein the water blocking material is a grease containing, as an organic liquid, at least one member selected from the group consisting of glycols and hydrocarbon oils which contain an element, other than carbon and hydrogen, of less than 1% by weight.

5. An optical fiber cable as defined in claim 1 wherein the water blocking material is a grease selected from the group consisting of greases comprising a metal soap and an organic liquid having a pour point of lower than 0° C., and having an unworked penetration of greater than 85 at 0° C., and greases comprising an organic liquid having a viscosity of 2 to 1,000 c.St. at 40° C. and 2 to 15 parts by weight, per 100 parts by weight of the organic liquid of lithium or aluminum soaps which are a salt of an organic acid having a carbon number of 4 to 40, and having a worked penetration of 130 to 475 at 25° C.

6. An optical fiber cable as defined in claim 1 wherein the water blocking material is a grease comprising a hydrocarbon oil having an aniline point of 50° to 128° C. and 4 to 40 parts by weight, per 100 parts by weight of the hydrocarbon oil, of at least one member selected from the metallic soaps consisting of (a) soaps of Ba, Sr, Zn, Pb, Cd, K, Na, Li, Ca, or Al with an organic acid having a carbon number of 1 to 7 and an organic acid having a carbon number of 8 to 36, (b) soaps of Al with benzoic acid and an organic acid having a carbon number of 8 to 36, and (c) soaps of a metal with an organic acid having a carbon number of 8 to 36.

7. An optical fiber cable as defined in claim 1 wherein the water blocking material is an urea grease comprising an organic liquid having a kinematic viscosity of 10 to 50,000 c.St. at 40° C. containing 1 to 30% by weight of an urea compound.

8. An optical fiber cable as defined in claim 4 wherein each of the optical fiber has the outer layer constructed with a member selected from the group consisting of urethane resins and epoxy resins.

* * * * *